Figure 1:
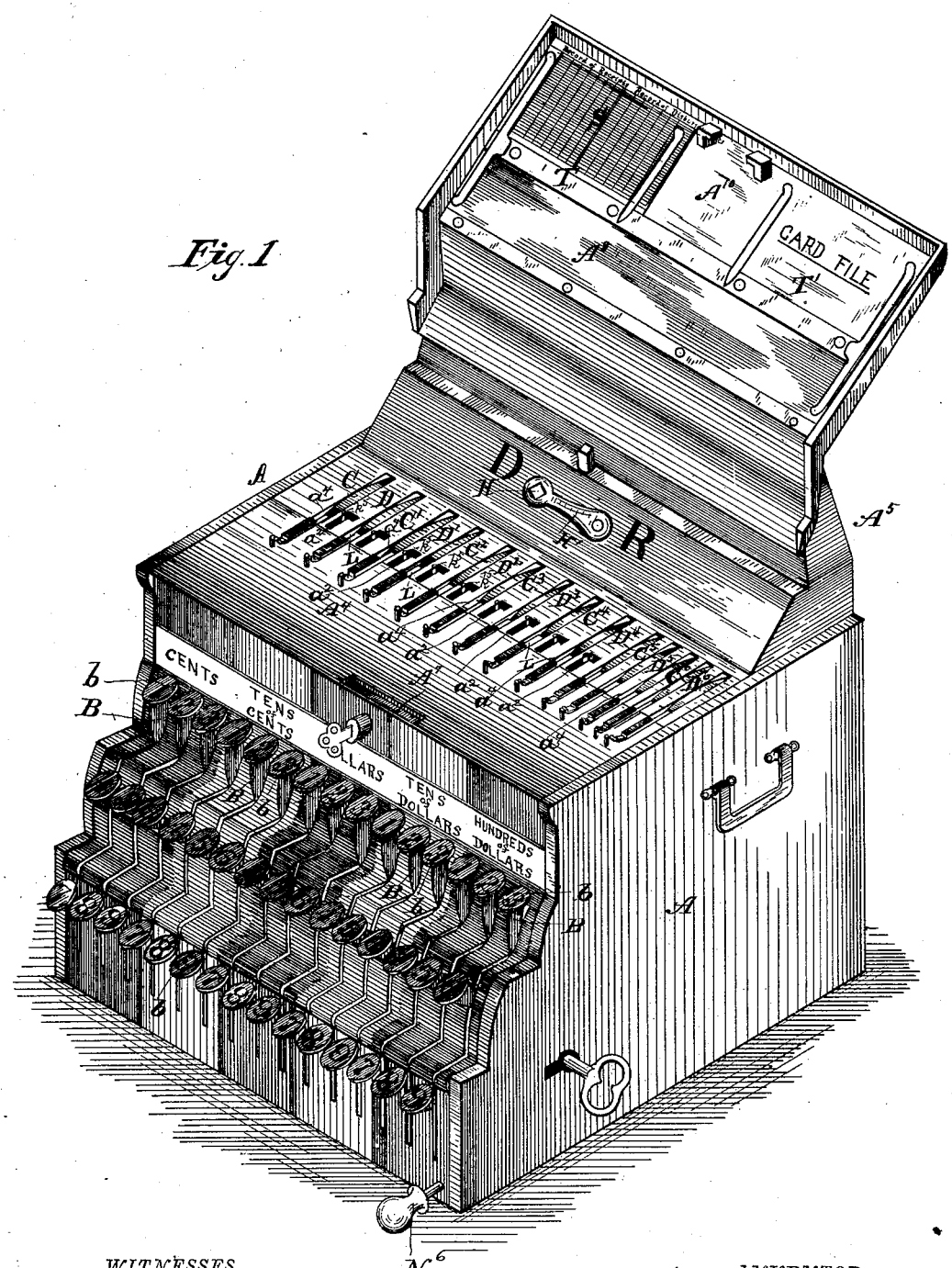

(No Model.)  16 Sheets—Sheet 1.

W. L. HORNE.
CASH INDICATOR AND REGISTER.

No. 357,959.  Patented Feb. 15, 1887.

WITNESSES
E. T. Walker
Chas. H. Baker

INVENTOR
William L. Horne
by his attorney (No Model.) 16 Sheets—Sheet 2.

W. L. HORNE.
CASH INDICATOR AND REGISTER.

No. 357,959. Patented Feb. 15, 1887.

WITNESSES
INVENTOR (No Model.)

16 Sheets—Sheet 5.

W. L. HORNE.
CASH INDICATOR AND REGISTER.

No. 357,959. Patented Feb. 15, 1887.

(No Model.)

16 Sheets—Sheet 6.

W. L. HORNE.
CASH INDICATOR AND REGISTER.

No. 357,959. Patented Feb. 15, 1887.

WITNESSES
E. T. Walker
Chas H. Baker

INVENTOR
William L. Horne
by his Attorney

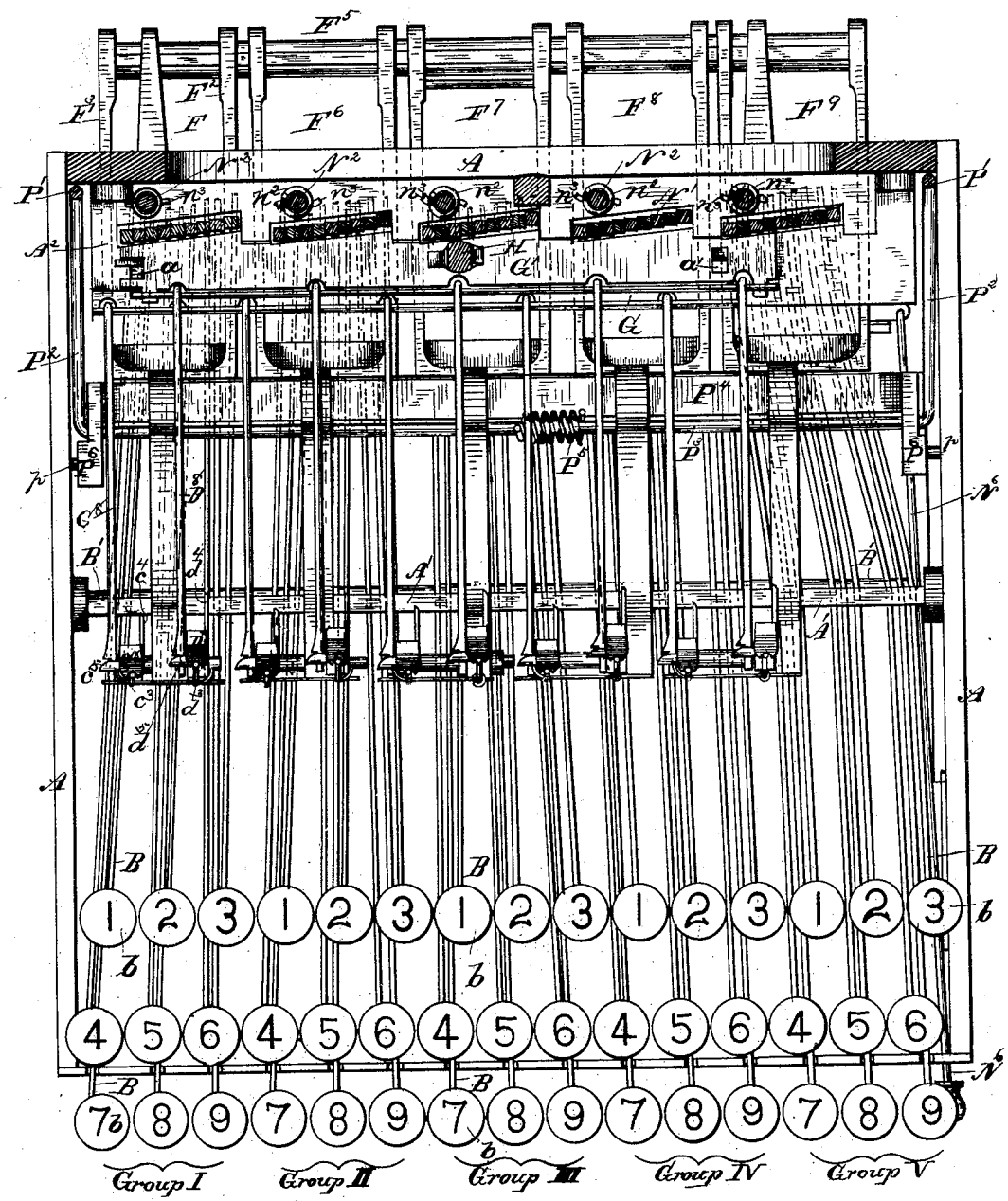

(No Model.) 16 Sheets—Sheet 8.

W. L. HORNE.
CASH INDICATOR AND REGISTER.

No. 357,959. Patented Feb. 15, 1887.

Fig. 12

Fig. 8.

WITNESSES
Chas. H. Baker
E. T. Walker

INVENTOR
William L. Horne
by his attorney

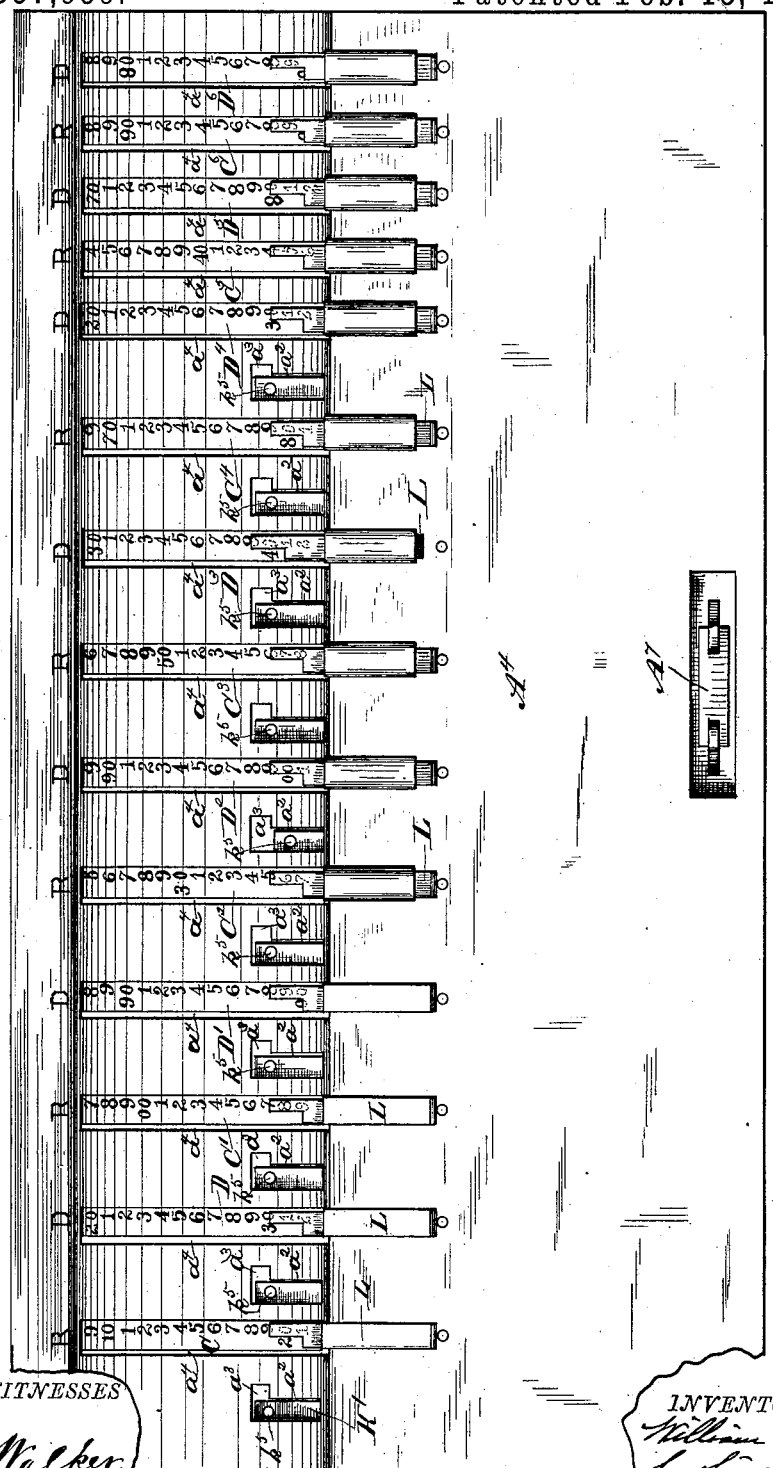

(No Model.) 16 Sheets—Sheet 10.
W. L. HORNE.
CASH INDICATOR AND REGISTER.
No. 357,959. Patented Feb. 15, 1887.
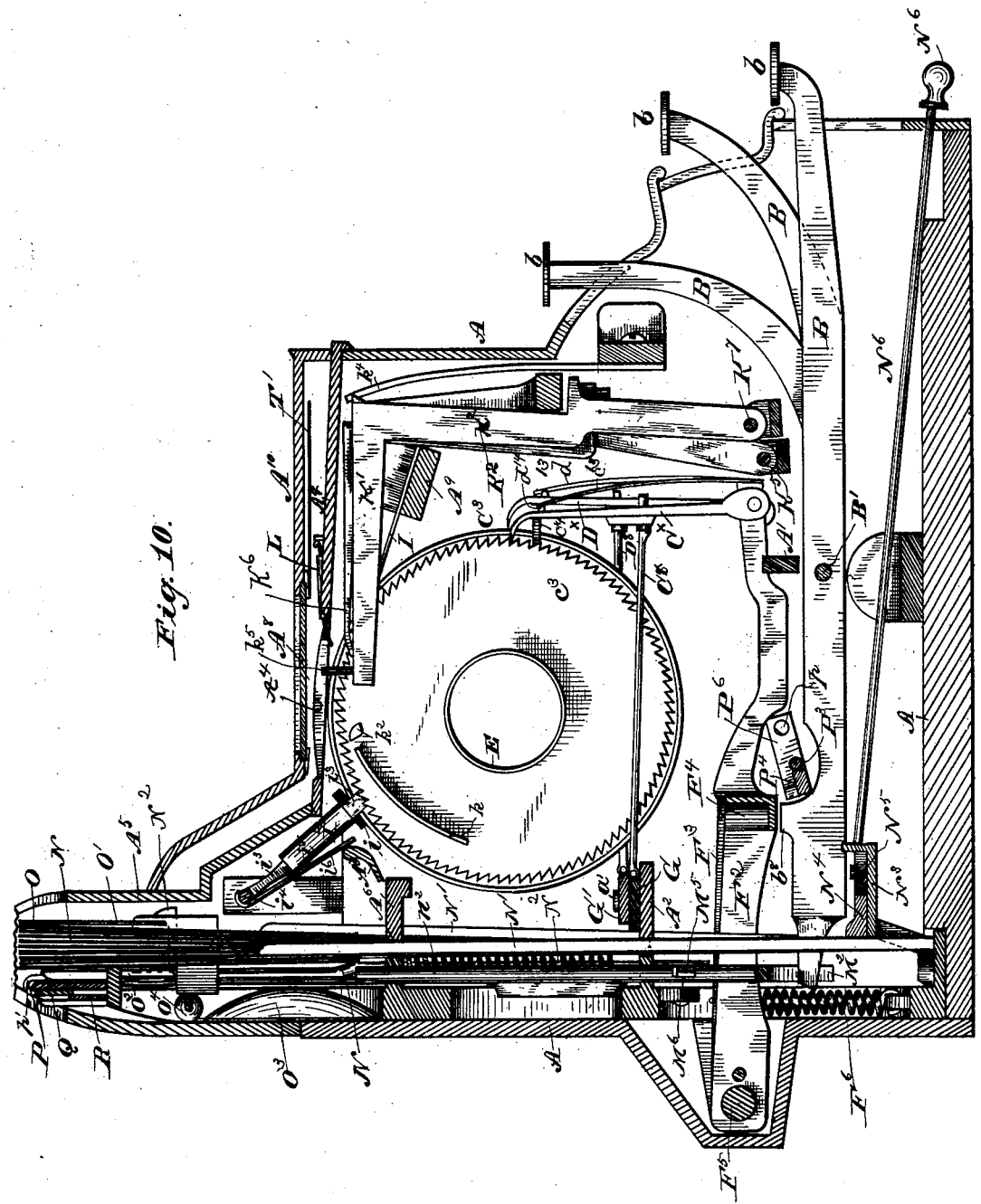

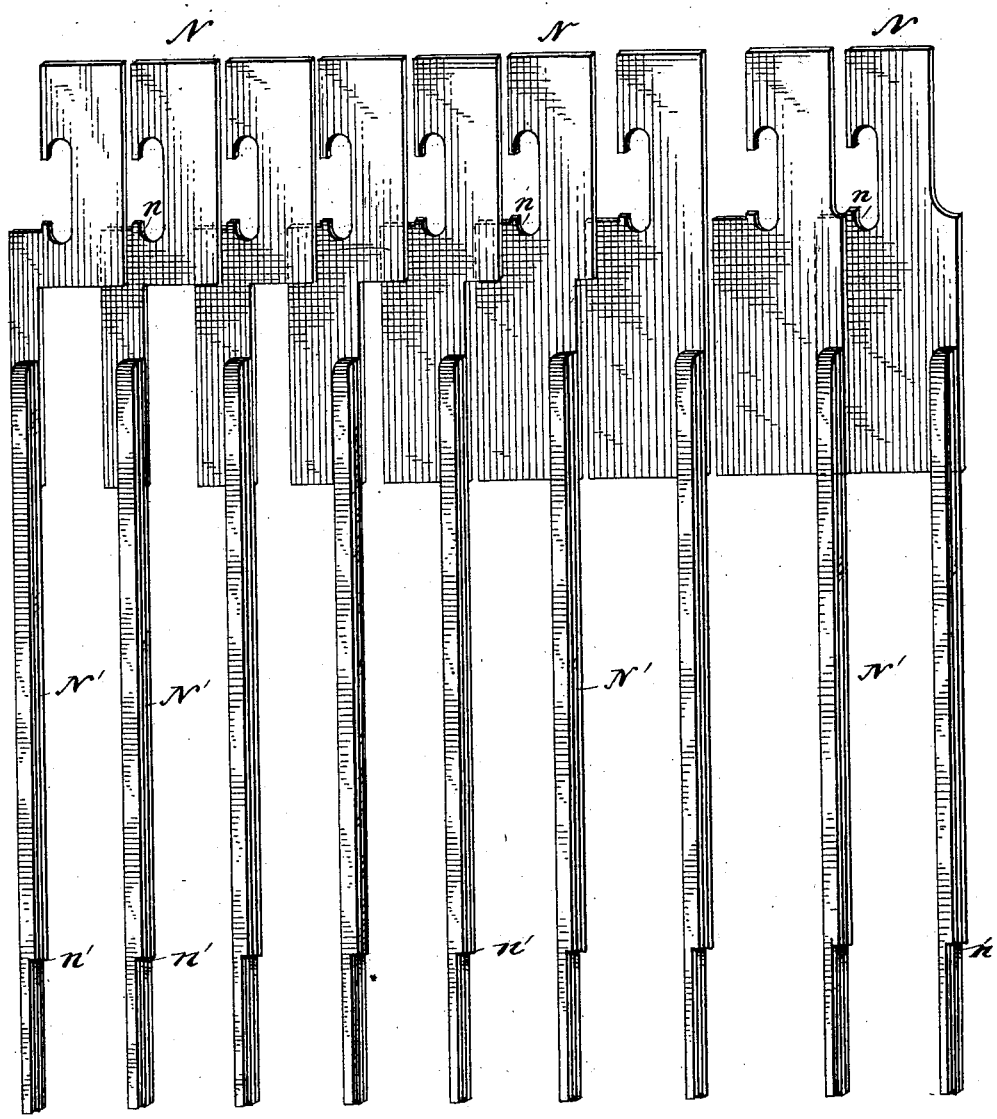

(No Model.) 16 Sheets—Sheet 12.
W. L. HORNE.
CASH INDICATOR AND REGISTER.
No. 357,959. Patented Feb. 15, 1887.
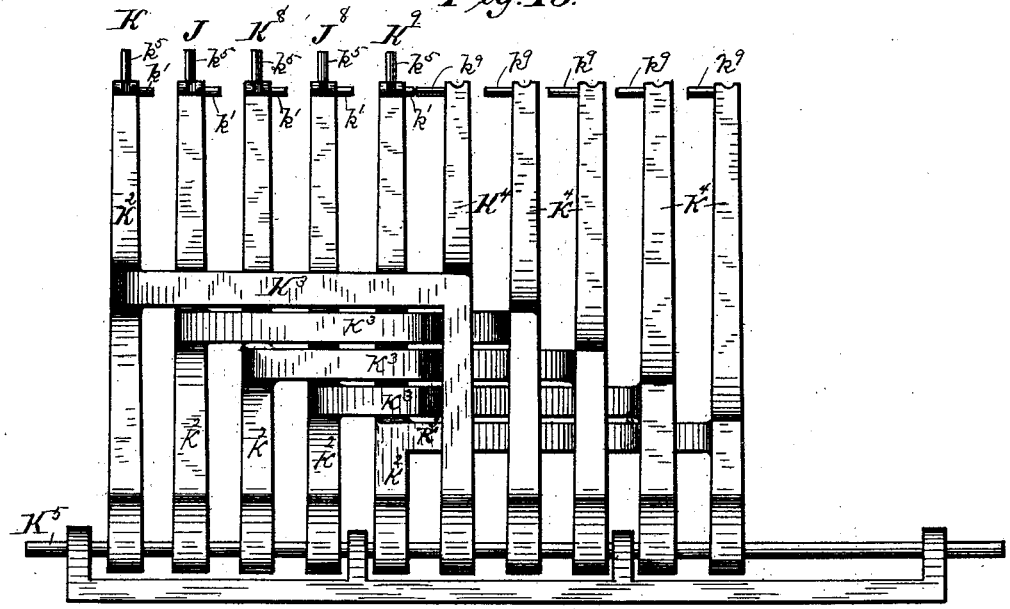
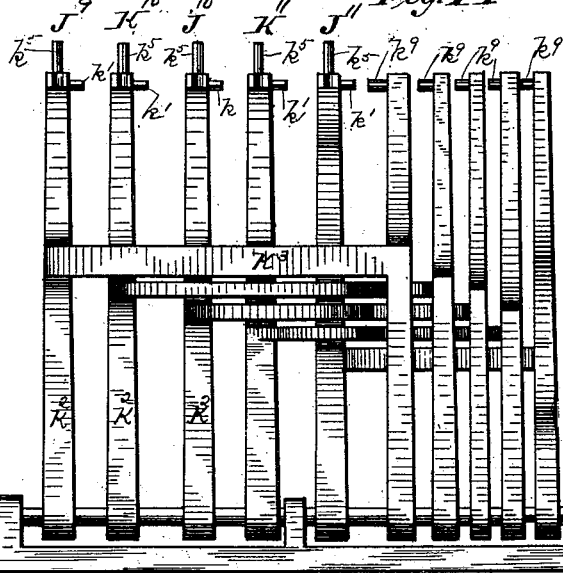
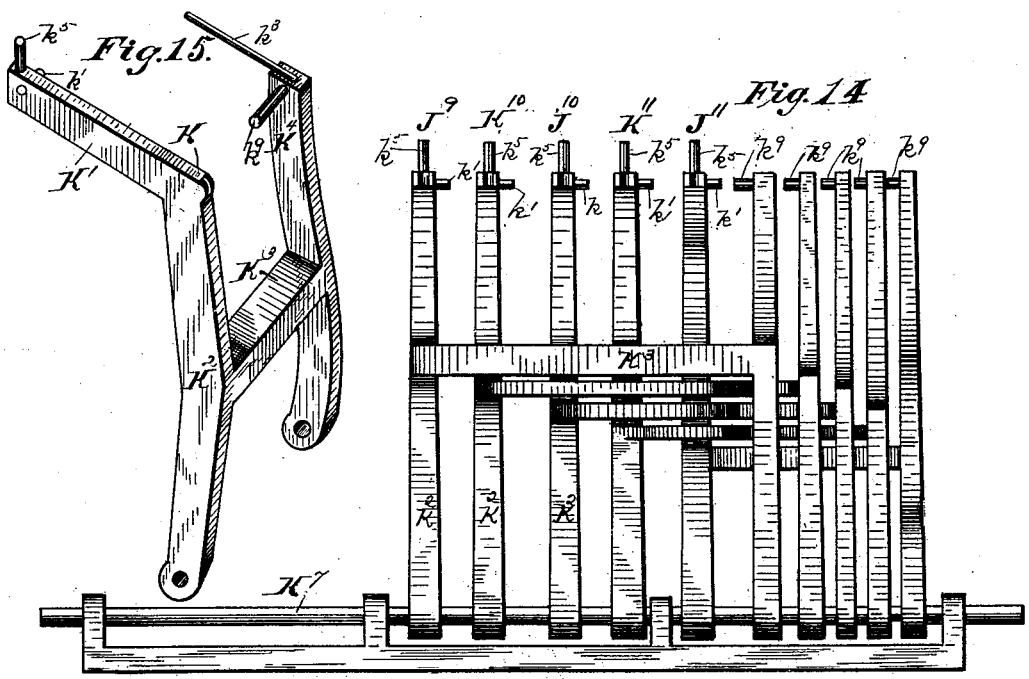
WITNESSES
E. T. Walker
Chas. H. Baker
INVENTOR
William L. Horne
by his attorney

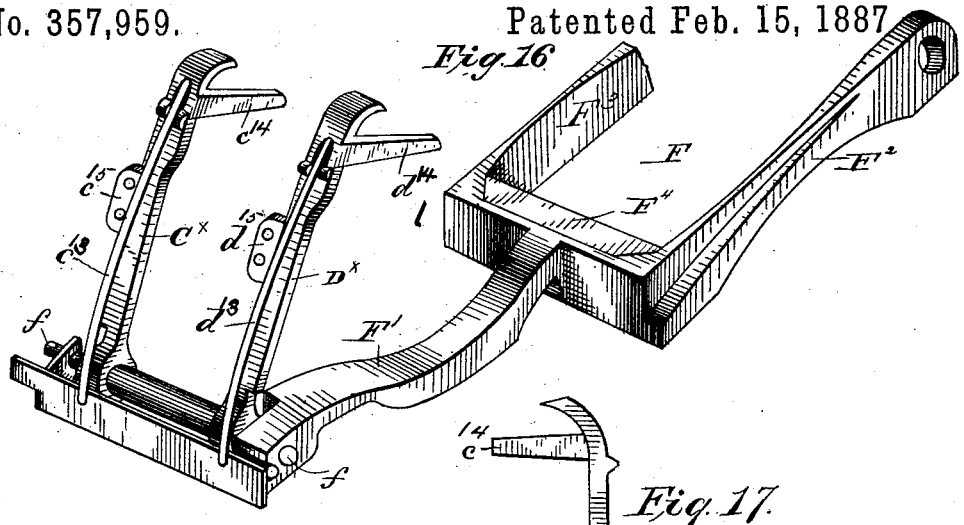

(No Model.) 16 Sheets—Sheet 14.
W. L. HORNE.
CASH INDICATOR AND REGISTER.
No. 357,959. Patented Feb. 15, 1887.
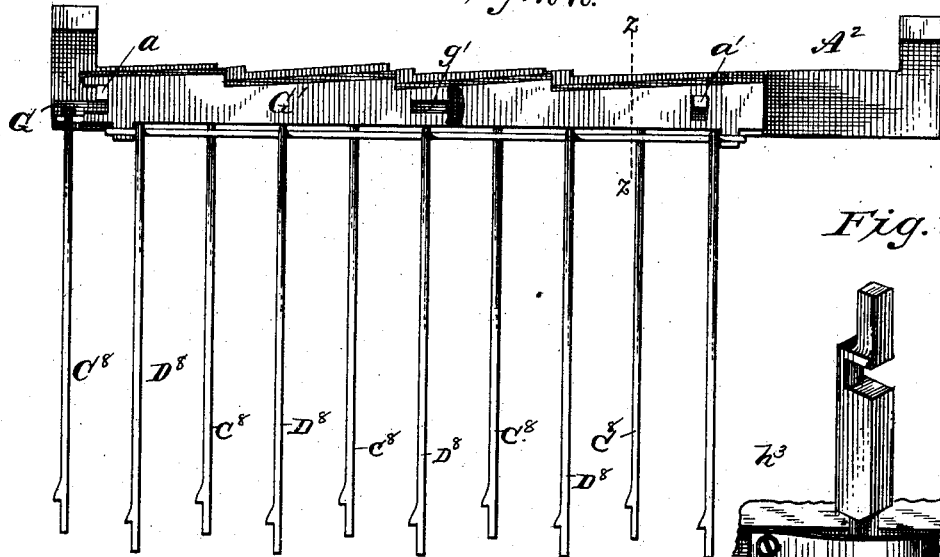
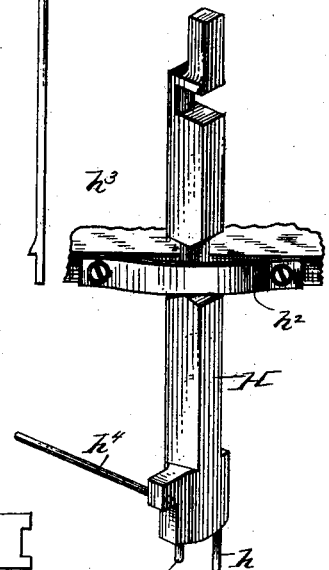
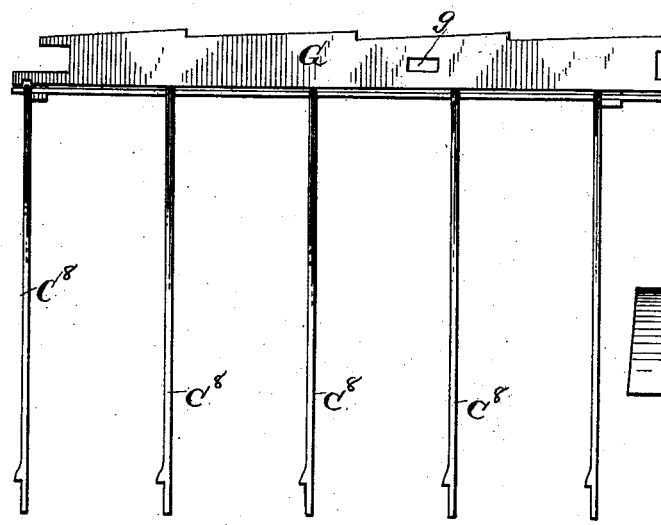
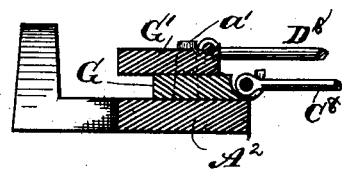
WITNESSES
INVENTOR (No Model.) 16 Sheets—Sheet 15.
W. L. HORNE.
CASH INDICATOR AND REGISTER.
No. 357,959. Patented Feb. 15, 1887.
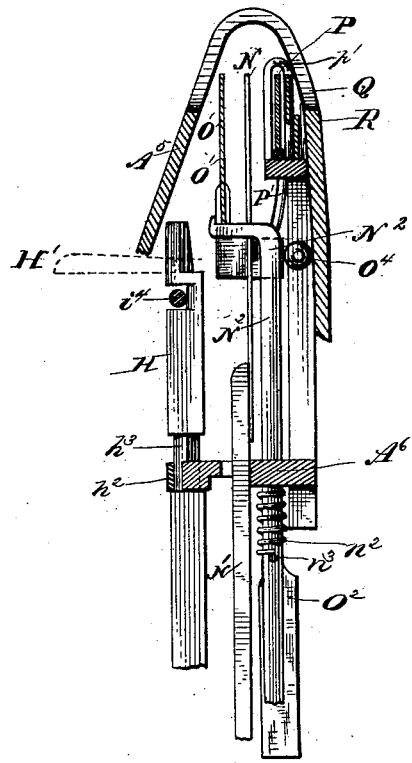
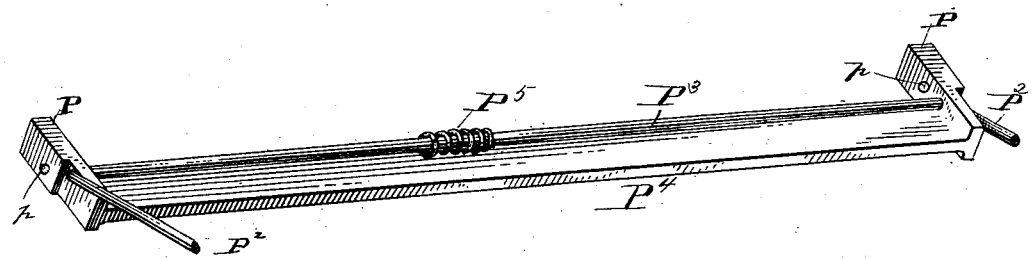
WITNESSES
INVENTOR (No Model.)
16 Sheets—Sheet 16.
W. L. HORNE.
CASH INDICATOR AND REGISTER.
No. 357,959. Patented Feb. 15, 1887.
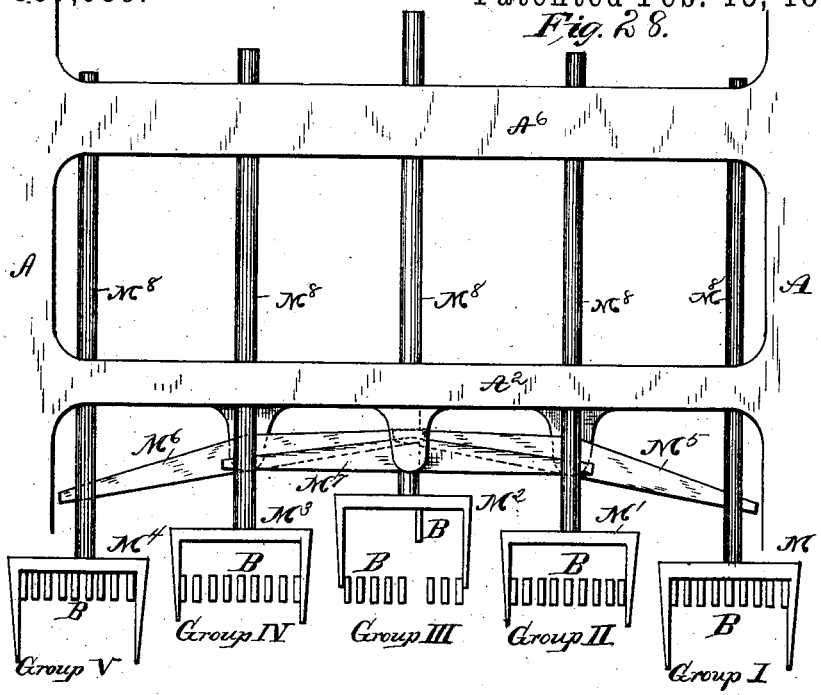
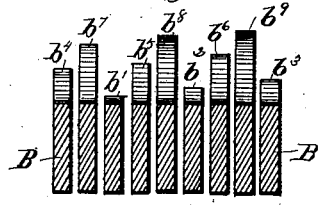
WITNESSES
E. T. Walker
W. M. Hannay
INVENTOR
William L. Horne
by his attorney

UNITED STATES PATENT OFFICE.

WILLIAM L. HORNE, OF MERIDEN, CONNECTICUT.

CASH INDICATOR AND REGISTER.

SPECIFICATION forming part of Letters Patent No. 357,959, dated February 15, 1887.

Application filed March 21, 1884. Serial No. 125,071. (No model.)

*To all whom it may concern:*

Be it known that I, WILLIAM L. HORNE, a citizen of the United States, residing at Meriden, in the county of New Haven and State of Connecticut, have invented certain new and useful Improvements in Cash-Receipt Indicators and Registers; and I do hereby declare the following to be a full, clear, and exact description of the invention, such as will enable others skilled in the art to which it appertains to make and use the same.

This invention consists of a machine for indicating and adding cash receipts, and disbursements as well, if required, embodying some of the features of the machine described in my United States Patent No. 308,259, dated November 18, 1884.

The parts, improvements, or combinations by which my present machine is distinguished from other inventions will be clearly pointed out, and distinctly claimed at the close of this specification.

In order that my invention may be clearly understood, I have illustrated in the annexed drawings, and will proceed to describe, a machine which is adapted to indicate and add cash receipts as well as disbursements, and which I have used with practical success.

Figure 2:
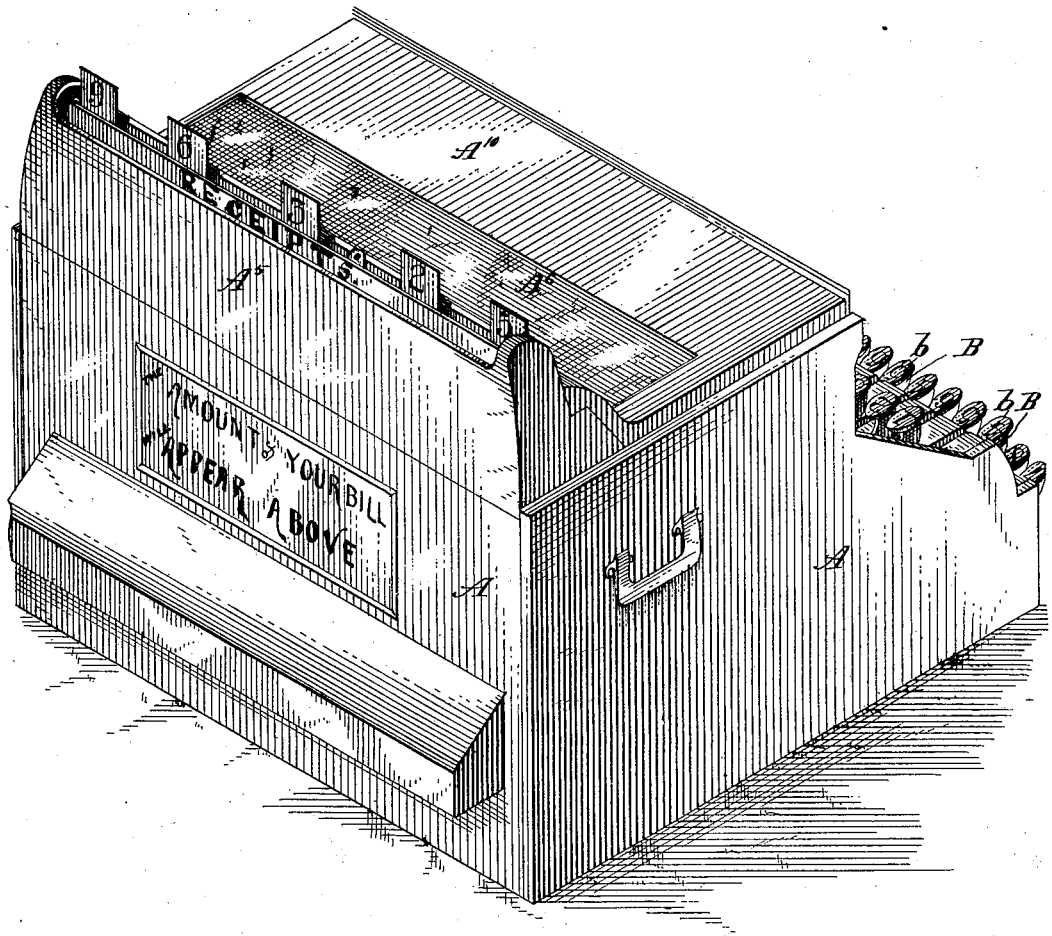
Figure 3:
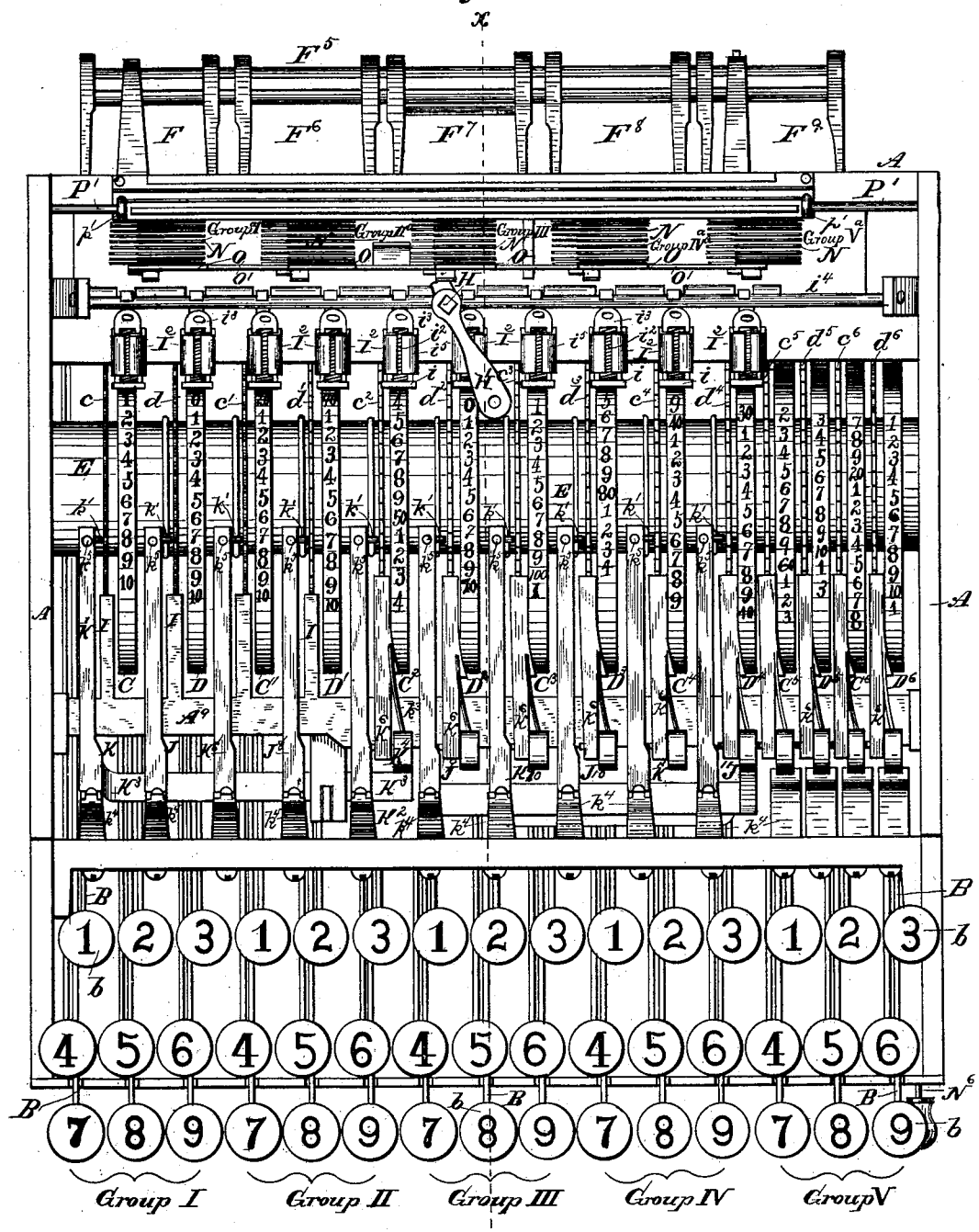
Figure 4:
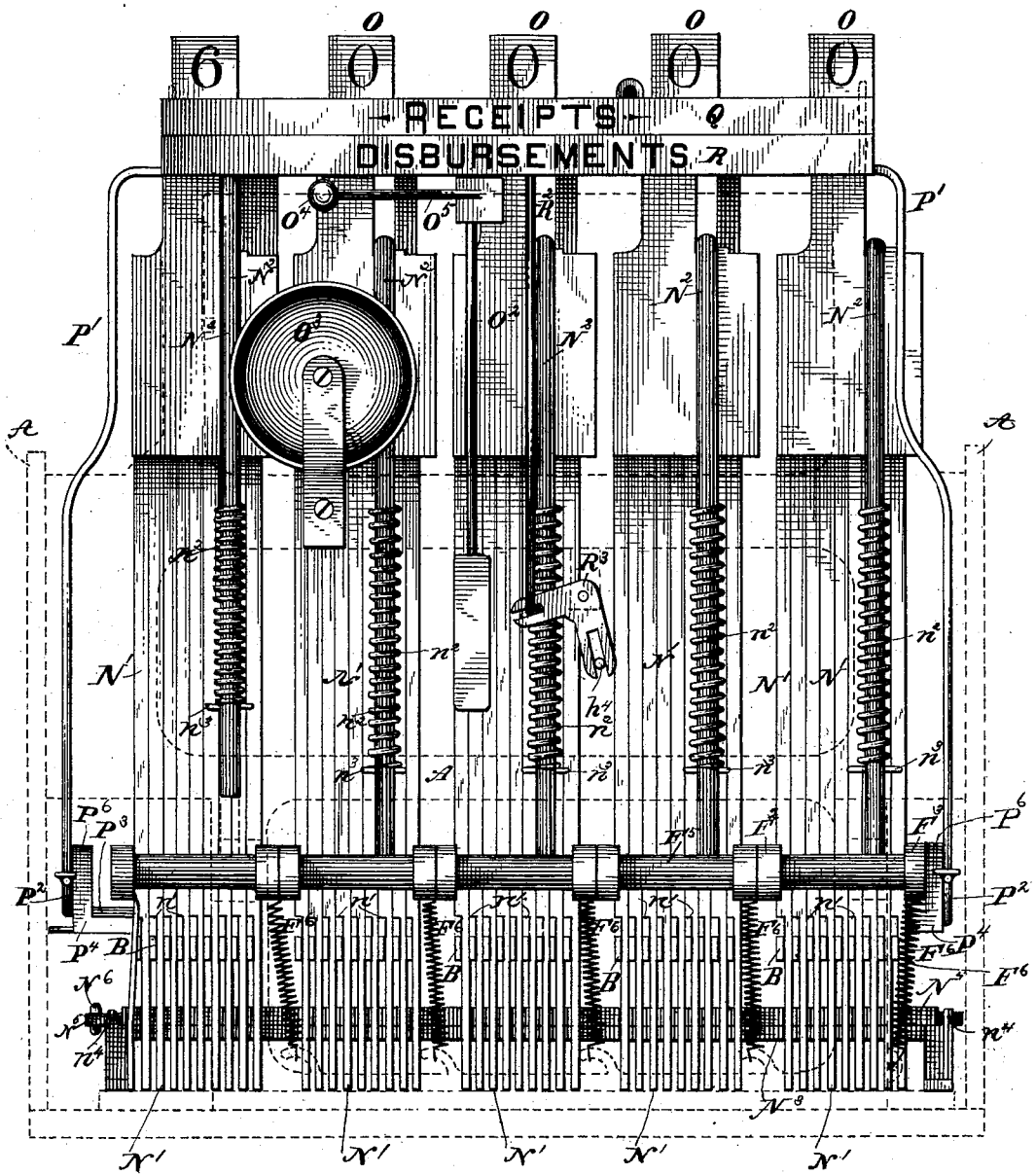
Figure 5:
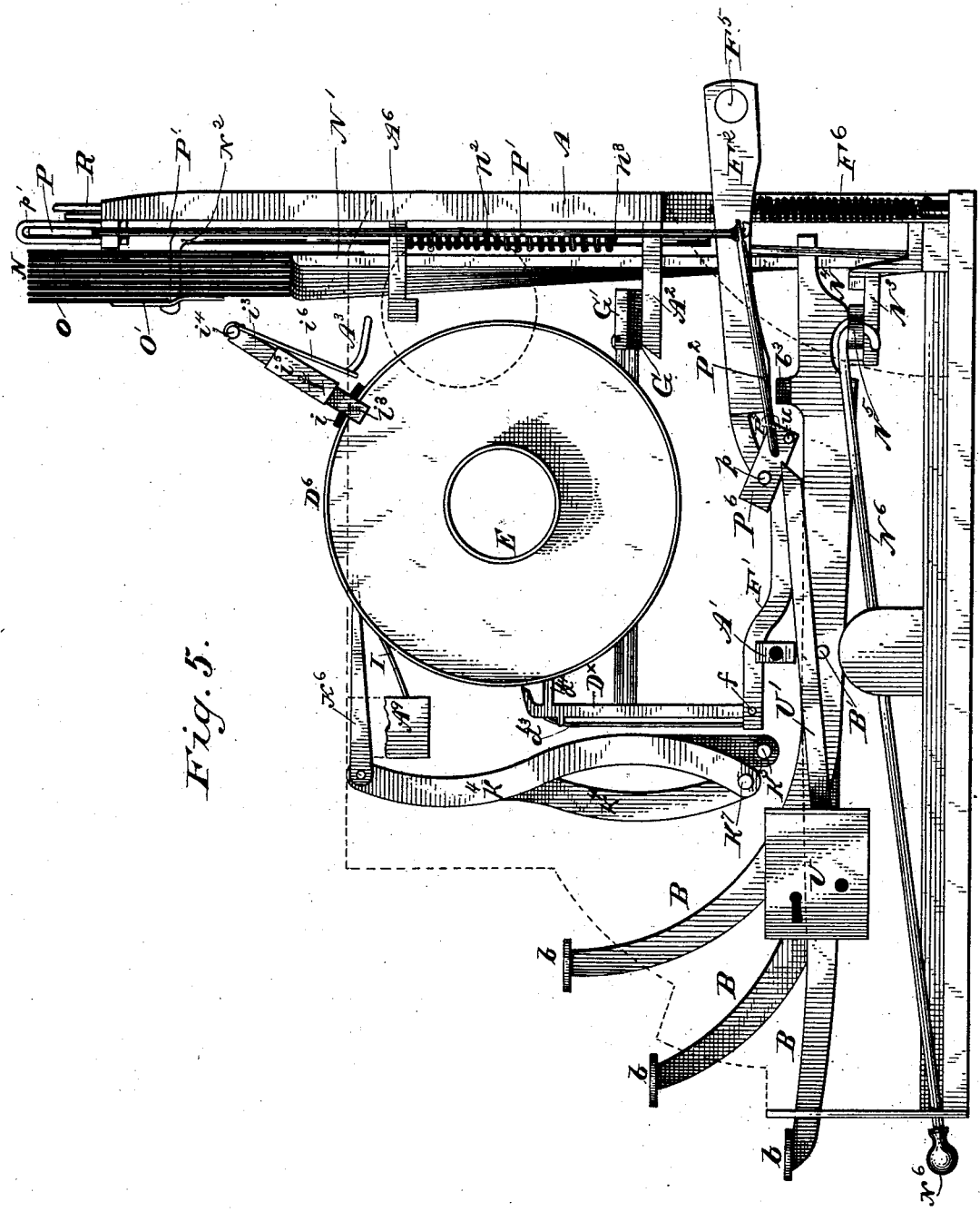
Figure 6:
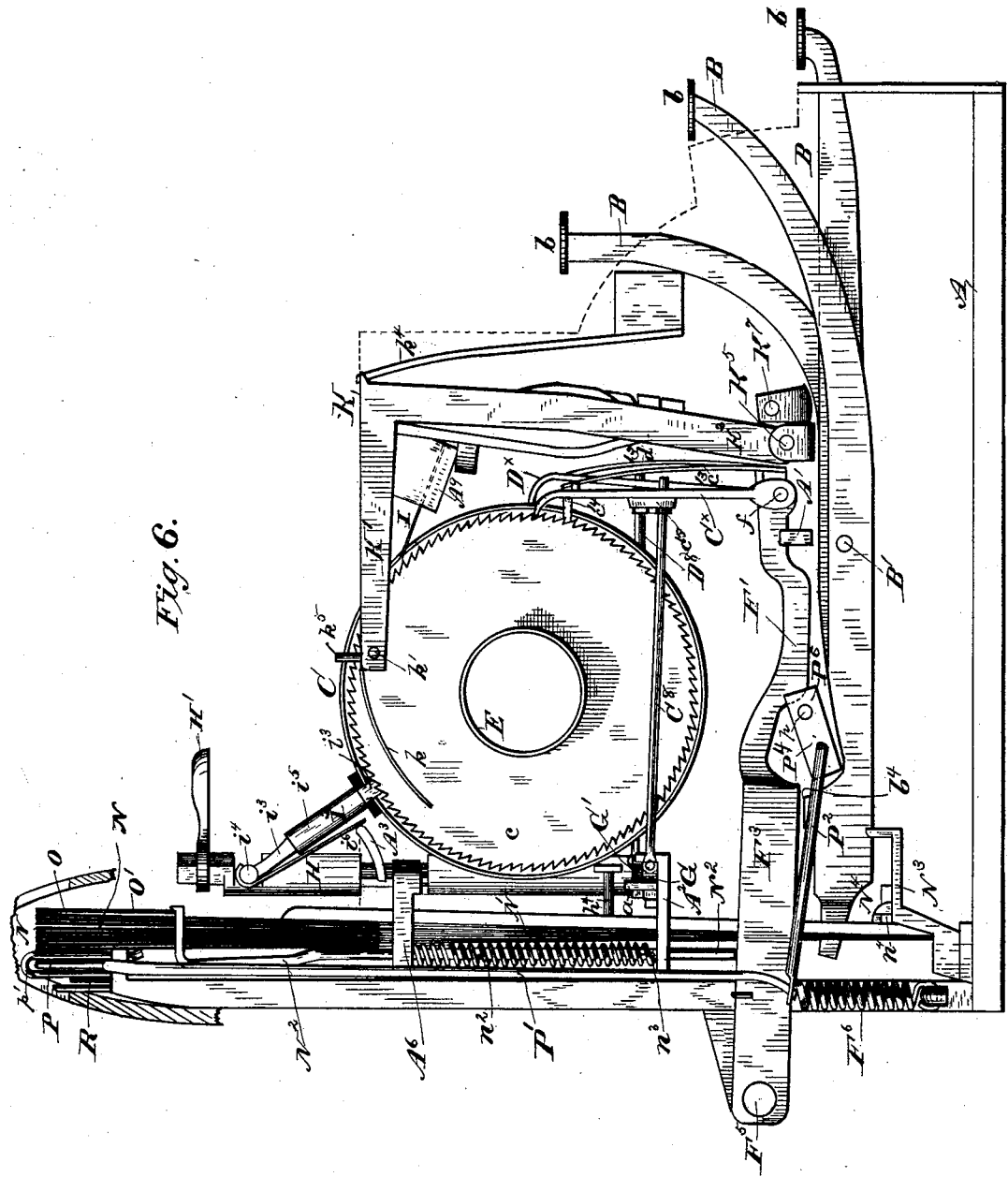

Figure 1 is a perspective view of the machine as it appears when the hinged lid of the casing or chest of the machine is unlocked and turned up. Fig. 2 is a perspective view of the machine as it appears from the other side and when the lid of the chest is turned down. Fig. 3 is a plan of the machine minus portions of the chest, removed to better expose to view the interior mechanism. Fig. 4 is an elevation of the front side of the machine—that is, the side where the signs appear showing the amount of money received or disbursed—the mechanism being exposed to view and only a portion of the chest shown, mostly in dotted lines. Fig. 5 is an outline elevation showing the side at the right of the cashier. Fig. 6 is an outline elevation showing the side at the left of the cashier. Fig. 7 is a sectional plan view illustrating the arrangement of parts below the register-wheels. Fig. 8 is a rear view of the register-wheels and their actuating-pawls. Fig. 9 is a partial plan view looking from above the plate which covers the register-wheels. Fig. 10 is a vertical section of the machine, taken in the plane indicated by broken line X X on Fig. 3. Fig. 11 is a view of one group of digit-signs, placed so as to show the construction of each. Fig. 12 illustrates a card for permanently recording the daily receipts and disbursements as given by the machine. Fig. 13 is a rear view of the transfer-levers pivoted on shaft $K^5$. Fig. 14 is a rear view of the transfer-levers pivoted on shaft $K^7$. Fig. 15 is a view of transfer-lever K. Fig. 16 is a detached perspective view of the lever and pawls employed to actuate the register-wheels. Fig. 17 is a side view of one of said pawls. Fig. 18 is a plan view of the push-off bar and its operating lever. Fig. 19 is a section through the said lever and bar and its supporting-shelf. Fig. 20 is a sectional view of the spring-brake employed for one of the register-wheels. Fig. 21 shows a portion of one of the ratchet-wheels and its retaining-pawl. Fig. 22 shows a plan view of the switch-bars and their supports. Fig. 23 is a top view of the lower switch-bar. Fig. 24 is a view of the key for moving the switch-bars. Fig. 25 is a transverse section of the switch-bars and their supports. Fig. 26 is a transverse vertical section of a portion of the casing, showing the construction of the spring-retractors. Fig. 27 shows the rock-bar, the rock-shaft, and the mode of connecting the two. Fig. 28 is a detail of the locking-forks and their pivoted levers. Fig. 29 is a sectional view of the key-levers, showing the relative height of the projections on the same.

The same letters of reference indicate identical parts in all the figures.

The major portion of the operative devices of the machine are compactly arranged in a casing or chest, A, having substantially the form best shown in Figs. 1 and 2. The key-levers B project through slots in the rear side of the chest, each being provided with a suitable button, *b*.

In the machine illustrated, the cash receipts are intended to be registered and added together by a system of seven register-wheels, C C' $C^2$ $C^3$ $C^4$ $C^5$ $C^6$, and the disbursements are intended to be registered by a similar system of register-wheels, D D' $D^2$ $D^3$ $D^4$ $D^5$ $D^6$, arranged alternately on a single longitudinal drum, E, which is fixed to the frame-work of the machine, and consists of a tube in this instance. The register-wheels are separated at proper distances by their hubs, which fill the entire length of the drum E. They are all of equal size in diameter, and the peripheral rim of each is marked with one hundred equally-spaced numbers, running from 0 to 99. The register-wheels C and D are used to register receipts or disbursements from one cent up to nine cents. The register-wheels C' and D' are used to register receipts or disbursements of ten cents or multiples thereof up to ninety cents. The register-wheels $C^2$ and $D^2$ are used to register receipts or disbursements of even dollars, from one up to nine. The register-wheels $C^3$ and $D^3$ are used to register receipts or disbursements of even dollars in sums of ten or multiples thereof up to ninety. The register-wheels $C^4$ and $D^4$ are used to register receipts or disbursements of even dollars in sums of one hundred or multiples thereof up to nine hundred. The register-wheels $C^5$ and $C^6$ and $D^5$ and $D^6$ operate as mere adding-wheels, which are actuated from preceding register-wheels in the manner which will be hereinafter explained.

It will be observed that the machine illustrated is capable of registering any single receipt or disbursement ranging from one cent up to nine hundred and ninety-nine dollars and ninety-nine cents. Each pair of register-wheels C and D, C' and D', $C^2$ and $D^2$, $C^3$ and $D^3$, and $C^4$ and $D^4$ is combined with a separate and distinct group of nine key-levers, B, so formed and disposed that the buttons $b$ of each group constitute three banks of keys. These five groups of keys are ranged side by side, and are marked on the drawings, respectively, group I, group II, group III, group IV, and group V. The nine keys of each group are marked each key with a different digit. All the key-levers are pivoted on a single longitudinal shaft, B'.

To the hub of each register-wheel is secured a ratchet-wheel provided with one hundred teeth on its periphery, the ratchet-wheel on the hub of register-wheel C being marked $c$, that on the hub of register-wheel D, $d$, and so on, each ratchet-wheel being marked with a small letter corresponding to the capital letter of the register-wheel, to the hub of which it is attached. The ratchet-wheel $c$ is operated by a pawl, $C^\times$, and the ratchet-wheel $d$ by a pawl, $D^\times$. These pawls, which I term the "register-pawls," are both pivoted on the same laterally-projecting pin $f$ on the rear end of the shank F' of a lever, F, which I term the "register-lever;" but only one of the pawls is in gear with its ratchet-wheel at a time, as will be explained fully hereinafter.

The forward end of the register-lever is forked, its two parallel prongs, $F^2$ and $F^3$, which are united with the shank F' by a cross-bar, $F^4$, being pivoted at their extreme outer ends on a longitudinal shaft, $F^5$. The shank F' of the register-lever is normally supported upon a longitudinal bar, A', of the frame-work, being held down thereon by a retractile spring, $F^6$, acting on the forked end of the lever. The nine key-levers of the keys of group I lie under the cross-bar $F^4$ of register-lever F, which cross-bar is located at some distance forward of the key-lever shaft B', so that the depression of any one of these keys may cause its lever, by operating on the cross-bar $F^4$, to lift the register-lever, together with its pawls $C^\times$ and $D^\times$, so as to effect an advance of one of the register-wheels C and D, according as pawl $C^\times$ or pawl $D^\times$ is at the time in gear with its ratchet-wheel. Directly beneath the cross-bar $F^4$ of the register-lever F the key-levers are provided each with an upward projection or riser. These risers, marked $b'$ $b^2$ $b^3$ $b^4$ $b^5$ $b^6$ $b^7$ $b^8$ $b^9$, are graduated in height, the riser $b'$ on lever of key 1 being the lowest and the riser $b^9$ on lever of key 9 being the highest, reaching up to quite near the cross-bar of the register-lever F. These risers are so graduated that each key, on being depressed, will cause an advance of one of the register-wheels C and D, corresponding in number of points to the number on the key. For instance, key 1 advances wheel C or D from 0 to 1, key 2 from 0 to 2, and so on. A spring, $c^{13}$, bearing on the back of register-pawl $C^\times$, tends to throw and hold it in gear with ratchet-wheel $c$, and a similar spring, $d^{13}$, acts in like manner on register-pawl $D^\times$. To guard against lateral displacement of these register-pawls, I provide each with a finger, $c^{14}$ and $d^{14}$, respectively, which projects into the space between the register-wheel and the ratchet-wheel on which the pawl is designed to act. For throwing the register-pawl $C^\times$ out of gear, I provide a push-rod $C^8$, one end of which projects through a perforated lug, $c^{15}$, on the pawl, bearing with a shoulder on said lug. The other end of this push-rod $C^8$ is pivoted to a crosswise-sliding switch-bar, G, supported on a longitudinal bar, $A^2$, of the frame-work between guide-lugs $a$ and $a'$ thereon. On top of switch-bar G is a second crosswise-sliding switch-bar, G', also guided by the lugs $a$ and $a'$. A push-rod, $D^8$, similar to push-rod $C^8$, is pivoted to switch-bar G', its other end being shouldered and projecting through a perforated lug, $d^{15}$, on register-pawl $D^\times$. Switch-bar G has a longitudinal slot, $g$, and switch-bar G' a ⊢-slot, $g'$. The longitudinal portion of slot $g'$ is engaged by the bit $h'$ of an upright key, H, while the slot $g$ is engaged by the bit $h$ thereof, which passes through the transverse portion of slot $g'$. A handle, H', may be applied to the upper angular end of the key. By turning the key in one direction the switch-bars are slid so as to push the register-pawl $D^\times$ back out of gear, and at the same time allow register-pawl $C^\times$ to engage its ratchet-wheel $c$, and by turning the key in the reverse direction the switch-bars are slid so as to push register-pawl $C^\times$ back out of gear and allow register-pawl $D^\times$ to engage its ratchet-wheel $d$. The movement of the switch-bars is limited by the lugs $a$ and $a'$. A spring, $h^2$, bears on one side or the other of the angular part $h^3$ of the key, and holds the key in either position to which it may be turned.

The keys of group II operate by their levers through means of graduated risers exactly like the graduated risers on the levers of the keys of group I, on a register-lever, $F^6$, the keys of group III similarly on a register-lever, $F^7$, the keys of group IV similarly on a register-lever, $F^8$, and the keys of group V similarly on a register-lever, $F^9$. These four register-levers are precisely like register-lever F, being also strung side by side on shaft $F^5$, and normally supported by their shanks on frame-bar $A'$. Each of these four additional register-levers carries a pair of register pawls constructed and arranged precisely like the register-pawls $C^x$ and $D^x$. The register-pawls of register-lever $F^6$ operate on ratchet-wheels $c'$ and $d'$, those of register-lever $F^7$ on ratchet-wheels $c^2$ and $d^2$, and so on, each pair of register-pawls operating on the ratchet-wheels of corresponding register-wheels.

All the register-pawls which operate the wheels for registering receipts are connected by push-rods, like rod $C^8$, to switch-bar G, and all the register-pawls which operate the wheels for registering disbursements are connected by similar push-rods to the switch-bar $G'$, so that by a single turn of key H either set of register-pawls can be pushed back out of gear and the other set allowed to fall in gear at the same time.

A retaining-pawl, I, is provided for the ratchet-wheel of each register-wheel, operating in the usual manner to prevent back motion of such wheels. These retaining-pawls are all secured to a single longitudinal bar, $A^9$, of the frame-work. In order that the register-wheels and their ratchet-wheels may not be carried by momentum beyond the point to which any one of the register-pawls is designed to turn them, and also to turn them back to such point if carried slightly beyond it, I provide each register-wheel, which is operated directly from the keys, with a spring-brake, $I^2$, so applied that it tends to turn the register-wheel in a direction reverse to that in which it is turned by the register-pawl and ratchet-wheel. The brake consists of a shoe, $i$, at the lower end of a pin, $i'$, encircled by a spiral spring, $i^2$, which is the brake-spring proper, and bears with its lower end on the shoe and with its upper end against the crotch of a fork, $i^3$. The shank of fork $i^3$ is pivoted on a longitudinal rod, $i^4$, which is supported in an elevated position in suitable standards of the frame-work. The fork $i^3$ is suspended obliquely, as shown, and its prongs reach just past the edges of the register-wheels, which latter thus holds the brake in place. The fork is encircled by a tube, $i^5$, for confining the spring. A spring, $i^6$, secured to the shank of fork $i^3$, bears with its free end against a longitudinal bar, $A^3$, of the frame, and tends to turn the brake on its pivot in a direction calculated to turn the register-wheel back as far as its retaining-pawl I will permit.

It will be observed that one point on register-wheel $C^2$ is equal in value to the one hundred points of register-wheel C; hence at every complete rotation of register-wheel C from 0 register-wheel $C^2$ must be advanced one point. This is effected by the following means: Ratchet-wheel $c$ is provided on one face with a cam, $k$, the high end of which terminates in this instance opposite the number 97 on register-wheel C. This cam operates on a laterally-projecting pin, $k'$, on the horizontal arm $K'$ of an elbow-lever, K, the lower end of whose vertical arm $K^2$ is pivoted on a horizontal shaft, $K^5$. This lever I term the "transfer-lever," which is also constructed with a horizontal arm, $K^3$, and a second vertical arm, $K^4$, to which latter, at its upper end, is pivoted a pawl, $K^6$, which engages the teeth of ratchet-wheel $c^2$, being held in gear therewith by a spring, $k^3$. (See Figs. 3, 5, and 10.) This pawl $K^6$ I term the "transfer-pawl." A spring, $k^4$, bears on the back of the transfer-lever, tending to hold it forward so that the transfer-pawl may always rest on ratchet-wheel $c^2$, the forward motion of the transfer-lever being arrested by the longitudinal frame-bar $A^9$. The effect of cam $k$ is to rock the transfer-lever back so far that the transfer-pawl will move back on ratchet-wheel $c^2$ one tooth. As soon as cam $k$ passes beyond pin $k'$ the transfer-lever may rock forward; but spring $k^4$ is preferably so adjusted that it is not quite strong enough to rock the transfer-lever and advance ratchet-wheel $c^2$, and a positively-acting pin, $k^2$, which I term the "transfer-pin," on ratchet-wheel $c$ is provided to rock the transfer-lever at the time when register-wheel C passes from 99 to 0, pin $k'$, in moving down, releasing itself from pin $k^2$ at the end of such movement, or thereabout. Spring $k^4$ is really provided simply to aid pin $k^2$. I find that the use of both the spring $k^4$ and pin $k^2$ possesses some advantages; but their conjoint use is liable to cause a false indication. If spring $k^4$ is strong enough to rock the transfer-lever, register-wheel $C^2$ will be advanced one point while register-wheel C moves from 97 to 98. If at such time the amount registered by the machine were taken, it would indicate one dollar beyond the actual receipts. I will presently describe the means by which such false movement is indicated and the amount registered corrected when it occurs. When register-wheel D completes a rotation, register-wheel $D^2$ is advanced one point by a mechanism substantially the same as that by which register-wheel $C^2$ is advanced one point at each complete rotation of register-wheel C. In like manner register-wheel $C'$ transfers to register-wheel $C^3$, $D'$ to $D^3$, $C^2$ to $C^4$, $D^2$ to $D^4$, $C^3$ to $C^5$, $D^3$ to $D^5$, $C^4$ to $C^6$, $D^4$ to $D^6$, $C^5$ to $C^7$, and $D^5$ to $D^7$, so that ten distinct transfer mechanisms are employed in this machine. Since the nine additional transfer mechanisms are all substantially the same as the one fully described, and differ therefrom and from each other only in the form of the transfer-levers, I have only lettered the transfer-lever of each J $K^8$ $J^8$ $K^9$ $J^9$ $K^{10}$ $J^{10}$ $K^{11}$ $J^{11}$, respectively.

The transfer-levers K J $K^8$ $J^8$ $K^9$ are nested and all pivoted on the same shaft $K^5$, as best shown in Fig. 13, and the transfer-levers $J^9$ $K^{10}$ $J^{10}$ $K^{11}$ $J^{11}$ are nested and strung on a shaft, $K^7$, as best shown in Fig. 14. The construction and distribution of the transfer-levers, as shown best in these two figures, enables me to arrange them very compactly. The register-wheels are covered by a horizontal plate, $A^4$; but somewhat more than one-tenth of the circumference of each register-wheel is visible and projects up through a cross-slot, $a^4$, in said plate, one such cross-slot being provided for each register-wheel. A pointer, L, is provided for each register-wheel, projecting from the rear edge of a slot, $a^4$, onto the marked rim of the wheel. As before remarked, the conjoint use of the spring $k^4$ and pin $k^2$ in the transfer mechanism makes a false movement possible. To indicate the occurrence of such false movement, I provide each transfer-lever with an indicator pin, $k^5$, which projects up through a cross-slot, $a^3$, in plate $A^4$. If, in taking the amount registered by the machine, any one of the ten register-wheels which operate the ten transfer-levers indicate 97 or 98 or 99, and the indicator-pin $k^5$ of its transfer-lever is in its normal or forward position, as shown, for instance, with respect to register-wheel D of Fig. 9, and the indicator-pin of its transfer-lever on the left, the person taking the amount registered knows from the position of the indicator-pin that register-wheel $D^3$ has been advanced one point prematurely by the reaction of the spring $k^4$, and in order to correct the indication of the machine he slides the pointer L of register-wheel $D^3$ forward one point, as shown in said figure. It will be observed that such a false movement is liable to occur on all the register-wheels, except on the first four, C D C' D', the pointers L of which are fixed; and in order that such false movement may be corrected before taking off the amount registered by the machine, the pointers L of the other register-wheels are movable to the extent of one point.

After taking down the amount indicated, the sliding pointers that may have been projected should be retracted. To facilitate the setting at zero of the register-wheels, which are operated directly from the keys and cannot be so easily turned with the fingers as the adding-wheels, I form a lateral branch, $a^3$, on the slots $a^2$, for the inserting of a pin or key, which is to be held there while the register-wheel is turned by the key marked 9, or any other, until the transfer-pin $k^2$ on the ratchet-wheel strikes the pin or key held in the branch $a^3$ of slot $a^2$, stopping further motion, at which instant the pointer will point to zero on the register-wheel.

Under certain circumstances the simultaneous depression of two keys, one key in either one of the three groups I, III, and V, and the other in another of said three groups, or one key in each of the two groups II and IV, would prevent the required transfer from the register-wheel of lesser value to the proper register-wheel of greater value. For instance, suppose register-wheel C stands at 95 when the cashier receives nine dollars and six cents. If he could then simultaneously depress key 9 of group III and key 6 of group I, the operation of transfer-pawl $K^6$ would produce no effect on register-wheel $C^2$, because the latter, with its ratchet-wheel $c^2$, would be advancing while the transfer-pawl is advancing, and consequently one rotation of register-wheel C, equal to one dollar, would not be transferred to register-wheel $C^2$. To render such a manipulation of the machine impossible, I provide the following means: A fork, M, is placed over the nine key-levers of the key of group I, a fork, M', over those of group II, a fork, $M^2$, over those of group III, a fork, $M^3$, over those of group IV, and a fork, $M^4$, over those of group V, as best shown in Fig. 28. Each fork is provided with a vertical stem, $M^8$, guided in suitable guides on the frame-work. A lever, $M^5$, centrally pivoted on the frame, engages with one end the stem of fork M and with the other end the stem of fork $M^2$. (See Fig. 28.) A similar lever, $M^6$, also engages with one end the stem of fork $M^2$ and with the other end the stem $M^8$ of fork $M^4$. A third similar lever, $M^7$, engages with one end the stem of fork M' and with the other end the stem of fork $M^3$. It will be readily observed that the lifting of any one of these forks, which I term "locking-forks," causes the depression of the fork to which it is connected by one of the three levers just referred to, and that the fork so depressed temporarily locks the group of key-levers which is embraced, so that they cannot be operated. While no key can be operated in group III at the same time that a key in group I is depressed, nor one in group V while one in group III is depressed, nor one in group IV while one in group II is depressed—which in this machine are the three conditions that must be complied with to prevent the indication of payments less than the actual receipts—two keys, respectively, in group I and group II, or in group I and group IV, or in group II and group III, or in group II and group V, or in group III and group IV, may be simultaneously operated to facilitate rapidity of registering.

Simultaneously with registering the receipts or disbursements of sums of money, the machine displays figures representing such sums. For this purpose I employ the following devices: A group of nine digit-signs, N, marked, respectively, 1, 2, 3, 4, 5, 6, 7, 8, 9, is provided for each group of key-levers. The digit-signs of each group are arranged in a transverse row behind one another, and the five groups marked, respectively, group $1^a$, group $II^a$, group III$^a$, group IV$^a$, and group V$^a$, are arranged in a longitudinal row in the front part of the chest of the machine, a suitable longitudinal opening being formed in the top of the elevated compartment A$^5$ of the chest, through which the digit-signs may be projected. Since the five groups of digit-signs are all alike in construction and arrangement, I shall describe only group I$^a$ in detail. Each digit-sign is secured to the upper end of a separate vertical stem, N'.

The points of attachment of the stems vary substantially as shown in Fig. 11, so that when the digit-signs are arranged in a row in front of one another their stems will stand in a close and slightly oblique rank, as shown best in Figs. 4 and 7, their lower ends projecting down between the prongs F$^2$ and F$^3$ of transfer-lever F. The lower ends of the stems are somewhat reduced on one side, forming a shoulder, $n'$, on each stem and a space between adjacent stems, through which project the front ends of the key-levers, which operate on the shoulders $n'$ to lift and project the digit-signs, one at a time, on the depression of a key of group I. The stems N' are guided in slots in frame-bar A$^2$ and A$^6$ somewhat loosely, so that they may have a slight lateral play in a direction crosswise of the machine. Each digit-sign is constructed with a shoulder, $n$, at its upper portion, as shown in Fig. 11. The hook end of a rod, N$^2$, hooks over these shoulders $n$ of all the digit-signs of each group. This rod N$^2$ is guided in the frame-bars A$^2$ and A$^6$, and is encircled between the frame-bar A$^6$ and a cross-pin, $n^3$, by a spiral spring, $n^2$, which tends to pull the rod down, so as to hold all the digit-signs in a retracted position below the top edge of the compartment A$^5$ of the chest. This rod N$^2$, with its spring $n^2$, I term "the spring-retractor." In their normal position—that is, when the digit-signs are retracted—the lower end of the stems N' rest on the base-plate of the chest. On depressing a key its lever lifts the stem of the corresponding digit-sign until the lower end of such stem reaches the level of a longitudinal shelf, N$^3$, which extends along the back of the stem in close proximity thereto. The tendency of the key-lever, in consequence of its motion in the arc of a circle, is to draw the stem toward and over onto shelf N$^3$, and, having already drawn the lower end of the stem toward the shelf, by the time the level thereof is reached, so that the stem is deflected somewhat from a vertical, the spring-retractor also tends to throw the stem over onto the shelf. A crosswise movable bar, N$^4$, which I term the "push-off bar," rests on shelf N$^3$, guided at its ends by projections $n^4 n^4$, which permit it to move back a little from the front edge of the shelf, with which front edge the front edge of the push-off bar is normally flush. Whenever a digit-sign is projected, its stem, in moving over onto shelf N$^3$, crowds the push-off bar back a little, far enough only to find a support on the shelf. After a digit-sign has been displayed its stem may be pushed off the shelf by the push-off bar, which rests with its back edge against one end of a lever, N$^5$, termed the "push-off lever," pivoted on the shelf N$^3$. To the other arm of the lever N$^5$ a rod, N$^6$, termed the "trigger," is pivoted, extending rearward through the rear side of the chest, so that it may be pulled by the cashier to move the push-off bar to the edge of the shelf and push-off the stems of all digit-signs displayed at the time. Back of every group of digit signs, except group V, is a cipher-sign, O. These four cipher-signs are all secured to a single longitudinal bar or plate, O', termed the "cipher-plate." The hook ends of all the spring-retractors reach under the plate O', so that the plate O' will be lifted thereby whenever any one of the spring-retractors is lifted, projecting all the cipher-signs simultaneously with the projection of any one of the digit-signs of any one of the five groups. The cipher-plate is secured to a vertical stem, O$^2$, supported by suitable guides on the frame-work in such manner that its lower end rests upon the frame-bar A$^2$ when the cipher-plate is in its lowest or retracted position. The stem O$^2$ is weighted in this instance, to insure the descent of the cipher-plate on its release from the spring-retractors.

The machine rings a bell whenever a figure indicating the amount of a single receipt or disbursement is withdrawn. Since the cipher-plate is always projected in making an indication of any sort, and descends on terminating such indication, I secure the clapper O$^4$ of a bell, O$^3$, by a slender horizontal rod, O$^5$, to the stem of the cipher-plate, the bell O$^3$ being mounted on the frame-work in proper position to be struck when the stem O$^2$ strikes the frame-bar A$^2$. The slender rod O$^5$ allows the clapper to continue its motion by momentum to strike the bell; but immediately thereafter withdraws the clapper again, so that the bell may give a clear ring.

In order that no figure may be displayed by the signs until the amount represented by such figure has been registered by the register-wheels and the register-levers have returned to their lowest position, I employ a shield, P, which is arranged in front of the five groups of digit-signs within the compartment A$^5$ of the chest. This shield is projected just in advance of the projection of any digit-sign, and remains projected so as to hide such projected sign until the key depressed has not only been released, but has returned to its normal position. The shield is connected by vertical rods P' P' to the outer ends of horizontal arms P$^2$ P$^2$, which project laterally from the respective ends of a longitudinal rock-shaft, P$^3$, journaled in suitable bearings in a longitudinal rock-bar, P$^4$ provided with arms P$^6$, which are pivoted at $p\ p$ to the frame-work. The pivoted rock-bar P$^4$ extends across all the five groups of key-levers, and rests on the upper edges thereof. The rock-shaft P$^3$ carries a spiral spring, P$^5$, one end of which is secured to the rock-shaft and the other end to the rock-bar P⁴. The upper ends of the rods P' are bent to form short horizontal portions, which move in vertical guides p' p', whereby the vertical movement of the shield is limited. When all the key-levers are at rest, the shield P is wholly within the compartment A⁵ of the chest. On depressing any one of the keys the initial motion of its lever rocks rock-bar P⁴, so as to throw up the outer end of the arms of rock-shaft P³ far enough to elevate the shield to its highest position. This effect is produced during the first part of the movement of the key-lever and before it operates at all on either its corresponding digit-sign or on its register-lever, on which it begins to operate, however, immediately afterward. In continuing its motion to project the digit-sign and operate the register-wheel, the key-lever continues to turn the rock-bar P⁴; and since the guides p' now prevent further upward motion of the rods P', the rock-bar and rock-shaft turn over each other, and wind up spring P⁵ during the time that it takes to project the digit-sign and place its stem on shelf N, during which same time the proper register-wheel is also advanced by its register-lever and register-pawl the number of points corresponding to the digit on the key, as before explained. On releasing the key the rock-bar P⁴ descends with the key-lever; but the spring P⁵ turns the rock-shaft in its bearings, so as to maintain the outer ends of its arms P² in their elevated position until wholly unwound, which does not occur until after the key-lever has wholly released the register-lever. As soon as the power stored in the spring has been expended the arms P² turn down with the rock-bar and the shield is retracted. The arms P² are quite long, so that a very slight motion of the rock-bar will move the outer ends of the said arms far enough to wholly project or retract the shield P.

In the front side of the mouth of compartment A⁵ and fixed to the guides p' p' is a plate, Q, which bears the inscription "receipts." In front of this plate Q is arranged a movable plate, R, which bears the inscription "disbursements." This plate is normally covered by the front side of compartment A⁵, above which it may be projected to cover the inscription on plate Q and display its own inscription. A vertical rod, R², secured to plate R, is at its lower end connected with the horizontal arm of an elbow-lever, R³, the vertical arm of which is connected with or engaged by a pin, h⁴, on the switch-key H. When the switch-key H is turned to throw in gear the register-pawls which operate on the register-wheels for registering disbursements, its pin h⁴ turns elbow-lever R³ so as to lift rod R² and plate R, and when the switch-key is turned in the reverse direction it operates the elbow-lever so as to retract plate R and uncover the inscription on plate Q.

At a point about midway between the groups II and III of digit-signs the plate Q is provided with an upwardly-projecting lug, q, marked with a "period" to indicate the division between dollars and cents.

A suitable lock, A⁷, is applied to the chest for locking the lid A¹⁰ thereof, so as to prevent tampering with the register-wheels. The lid may be constructed with an opening closed by a plate of glass, A⁸, through which the register-wheels may be inspected, and the indication of the machine taken at any time without unlocking the lid. The daily register of the machine may be kept on cards S, each of which is suitably ruled to receive the total amount registered daily for one month of both receipts and disbursements. For convenience of filing these cards the under side of the lid A¹⁰ is provided with two card-files, T and T', one of which is to be used for the current card and the other for filled cards. These cards afford a ready means of ascertaining the state of the business at any given time as compared with that of a previous time, and of ascertaining the monthly or yearly receipts and disbursements. These entries may be made in a book, if preferred; but the cards afford a means for keeping monthly records with the machine, by which the record for a number of days can be compared with the current day's work at a glance.

For the protection of the cashier I also provide the machine with a lock, U, the bolt U', Fig. 5, of which is adapted to be shot over a pin, u, on the rock-bar P⁴, and thus lock said rock-bar, and through it all the key-levers, so that the keys cannot be operated.

To indicate and register a receipt or disbursement, as the case may be, of nine hundred and sixty-three dollars and twenty-five cents, the figure displayed by the machine, as illustrated in Fig. 2, the cashier successively depresses the following keys—namely, key 9 of group V, key 6 of group IV, key 3 of group III, key 2 of group II, and key 5 of group I.

To indicate and register a receipt or disbursement of six hundred dollars, the figure displayed by the machine, as illustrated in Fig. 4, the cashier need depress only key 6 of group V, the cipher-signs being simultaneously projected with the single digit-sign.

A convenient way of taking the indication of the machine is to add together the indication of the respective register-wheels of a group, as follows: Referring to the indication of receipts shown in Fig. 9, which is exhibited by the register-wheels C C' C² C³ C⁴ C⁵ C⁶—

| | | |
|---|---|---:|
| C⁶ | indicates | $980,000 00 |
| C⁵ | " | 44,000 00 |
| C⁴ | " | 7,900 00 |
| C³ | " | 560 00 |
| C² | " | 35 00 |
| C¹ | " | 70 |
| C | " | 19 |
| | Total receipts | $1,032,495 89 |

Referring to the indication of disbursements shown by the register-wheels D D' D² D³ D⁴ D⁵ D⁶—

| | | |
|---|---|---|
| D⁶ indicates | | $880,000 00 |
| D⁵ " | | 80,000 00 |
| D⁴ " | | 3,000 00 |
| D³ " | | 390 00 |
| D² " | | 99 00 |
| D¹ " | | 9 80 |
| D " | | 30 |
| Total disbursements | | $963,499 10 |

Deducting disbursements from receipts—

$1,032,495 89
963,499 10
─────────
$68,996 79 shows the amount which the cashier should have in his drawer.

I have described the machine illustrated as intended for indicating and registering receipts and disbursements; but it is obvious that its two groups of register-wheels may be used for registering receipts from or payments to two different persons or firms. The machine may also be used as an adding-machine.

The capacity of the machine for keeping several accounts may be increased without increasing the number of keys, by the addition of one or more groups of register-wheels and the requisite ratchet-wheels and register-pawls therefor, and its capacity for registering up to large amounts may be increased by adding one or more adding register-wheels to each group. Where only one account requires to be kept, the machine will be provided with a single group of register-wheels. In some cases it may only be necessary to keep a register. In some cases the indicating signs and devices connected therewith may be omitted.

It is obvious that the details of the machine may be much changed without changing the essential novel characteristics thereof set forth concisely in the claims.

I claim as my invention—

1. The combination, substantially as before set forth, of a group of nine key-levers, a single register-lever, and two register-pawls, two independent register-wheels, each marked with one hundred equally-spaced figures (from 0 to 99) around its periphery, and two ratchet-wheels provided with one hundred teeth, one connected with each of such register-wheels, substantially as described.

2. The combination of two independently-operative register-wheels, the one of the higher value having a ratchet attached thereto, with a transfer mechanism having a pawl engaging said ratchet and being moved positively backward and forward by the wheel of lesser value once during a single rotation, substantially as described.

3. The combination of two independently-operative register-wheels with a transfer mechanism provided with a projection lying in close proximity to the register-wheel of less value, said wheel being provided with two projections, $k$ and $k^2$, the one for moving the transfer mechanism in one direction and the other for moving it in the opposite direction, whereby the register-wheel of greater value is moved one point at each rotation of the one of lesser value, substantially as described.

4. The combination of a series of register-wheels, each marked with one hundred equally-spaced figures (from 0 to 99) around its periphery, and a transfer mechanism which advances the register-wheel third in value one point at each complete rotation of the one of least value, and a further transfer mechanism which advances the fourth in value one point at each complete rotation of the second in value, substantially as before set forth.

5. The combination, substantially as before set forth, of a group of nine key-levers, a single register-lever, two independent register-wheels, a ratchet-wheel for each register-wheel, two register-pawls (one for each ratchet-wheel) mounted on the said register-lever, and a switch mechanism for holding either of the register-pawls out of gear while the other is in gear.

6. The combination, substantially as before set forth, of two register-wheels, each provided with a ratchet-wheel, a transfer-lever and pawl for advancing the register-wheel of greater value one point at each complete rotation of the one of lesser value, a spring tending to actuate the transfer-lever, an indicator-pin on said lever, and a movable pointer for the register-wheel of greater value.

7. The combination, substantially as before set forth, of a register-wheel and a ratchet-wheel therefor, a retaining-pawl, and a spring-brake which constantly tends to turn the register-wheel back.

8. The combination, substantially as before set forth, of two independently-operative register-wheels, each provided with a ratchet-wheel, two independent register-levers, each carrying a register-pawl, two independent groups of key-levers, a locking-fork for each group of key-levers, and a centrally pivoted lever connecting the two locking-forks.

9. The combination, substantially as before set forth, of a group of digit-signs and a single retractor.

10. The combination, substantially as before set forth, of a number of groups of digit-signs, a retractor for each group, and a single movable cipher-plate.

11. The combination, with the movable cipher-plate and its stem, of a clapper attached thereto and a bell below, substantially as described.

12. The combination, substantially as before set forth, of a key-lever, the rock-bar, the rock-shaft, the shield connected to the arms of the rock-shaft, the fixed guides which limit the projection of the shield, and the spring connecting the rock-bar and rock-shaft.

13. The combination, substantially as before set forth, of a fixed sign, Q, a movable sign, R, the switch-key, and the elbow-lever R³, connected substantially as described.

14. The combination of a group of nine key-levers, a single register-lever parallel with said key-levers and provided with a portion extending across the same, with two pawls attached to said register-lever, two register-wheels, a ratchet-wheel connected to each of such register-wheels, and devices for throwing said pawls into and out of engagement with said ratchet-wheel, substantially as described.

15. The combination, with a single register-lever, of a register-pawl connected therewith, a register-wheel marked with figures upon its periphery, a ratchet-wheel connected with said register-wheel engaged by said pawl, and a group of nine key-levers extending beneath the register-lever and parallel therewith, each of said key-levers being provided with a projection of different lengths engaging said register-lever, substantially as described.

16. The combination, with two independent register-wheels, two ratchet-wheels, one connected with each of said register-wheels, the register-wheel of lesser value being provided with projections $k\,k^2$, and independent means for operating the same, of a transfer mechanism consisting of a lever having two arms, one of which is provided with a projection which extends in the path of projection $k\,k^2$, and the other provided with a pawl engaging the ratchet on the wheel of greater value, whereby the wheel of greater value is moved one point at each complete rotation of the wheel of lesser value, substantially as described.

17. The combination, with a register-wheel and a ratchet-wheel attached thereto, of means for operating said ratchet-wheel, a retaining-pawl engaging said ratchet-wheel, and a friction-brake engaging the periphery of the register-wheel and acting constantly to retard the movement of the register-wheel, substantially as described.

18. The combination of a register-wheel, a ratchet-wheel attached thereto, and an actuating-lever provided with a pawl engaging said ratchet, with a retaining-pawl engaging said ratchet, and a spring-brake provided with a friction-surface engaging said register-wheel between a radial and tangential direction, whereby said brake is made at all times to resist the movement of the register-wheel and tend to throw it back against its retaining-pawl, substantially as described.

19. The combination, with a register-wheel, a ratchet-wheel attached thereto, and an actuating-lever provided with a pawl engaging said ratchet, of a retaining-pawl engaging said ratchet, a pivoted brake-arm consisting of two parts with a spring interposed between them, the outer end of said brake-arm being provided with a friction-surface engaging said register-wheel, the said pivoted brake-arm lying between a radial and tangential direction, and a spring on the under side of said brake-arm, substantially as described.

20. The combination of the fixed sign-plate, the movable sign-plate, the switch-key mounted in vertical bearings and provided at its lower end with a horizontal arm, the bell-crank lever slotted at one end to engage the arm of the switch-key, and a rod connecting the other arm of the bell-crank lever, substantially as described.

21. The combination, with two independent register-wheels, each provided with a ratchet-wheel, an actuating-lever provided with two pawls engaging the ratchets of the two ratchet-wheels, and two slides, one connected to each of said pawls, of a switch-key mounted in vertical bearings and engaging said slides, whereby the switch-key may operate to throw said pawls in and out of operative position, substantially as described.

22. The combination of two register-wheels, two ratchet-wheels attached thereto, and an actuating-lever provided with two pawls engaging said ratchets, two slides connected with said pawls, a fixed sign, a movable sign, and the switch-key engaging said slide and connected with said movable sign, whereby the movable sign is raised to cover the fixed sign at the same time that one pawl is thrown into and the other thrown out of operative position, substantially as described.

In testimony whereof I affix my signature in presence of two witnesses.

WILLIAM L. HORNE.

Witnesses:
C. A. NEALE,
W. M. HANNAY.